United States Patent
Wells

(10) Patent No.: US 7,739,830 B1
(45) Date of Patent: Jun. 22, 2010

(54) VACUUM-CREATING FLY SWATTER

(76) Inventor: Leola Wells, 26 Brookfield Ave., Center Moriches, NY (US) 11934

( * ) Notice: Subject to any disclaimer, the term of this patent is extended or adjusted under 35 U.S.C. 154(b) by 747 days.

(21) Appl. No.: 11/388,127

(22) Filed: Mar. 23, 2006

(51) Int. Cl.
*A01M 3/02* (2006.01)

(52) U.S. Cl. ......................................... 43/137; 43/132.1

(58) Field of Classification Search ................. None
See application file for complete search history.

(56) References Cited

U.S. PATENT DOCUMENTS

| | | | | |
|---|---|---|---|---|
| 1,112,991 | A | * | 10/1914 | Dufner ........................ 83/857 |
| 1,860,939 | A | | 5/1932 | Miller |
| 1,882,291 | A | * | 10/1932 | Monroe et. al. ............... 43/137 |
| 1,939,838 | A | * | 12/1933 | Wasson ........................ 43/137 |
| D91,616 | S | * | 2/1934 | Drake ........................ D22/124 |
| 2,736,129 | A | | 2/1956 | Roop |
| 2,934,851 | A | * | 5/1960 | Grish ........................... 43/137 |
| 3,673,730 | A | | 7/1972 | Hegenberger |
| 3,984,937 | A | | 10/1976 | Hamilton |
| 4,653,222 | A | | 3/1987 | Viscosi |
| 5,377,446 | A | * | 1/1995 | DiLeo .......................... 43/137 |
| 5,586,407 | A | | 12/1996 | Raymond |
| D415,814 | S | | 10/1999 | Re |
| 6,055,767 | A | | 5/2000 | Carter |

* cited by examiner

*Primary Examiner*—Christopher P Ellis
(74) *Attorney, Agent, or Firm*—Richard L. Miller

(57) ABSTRACT

A vacuum-creating fly swatter. A blade is flat and a handle is hand-held, slender, elongated, and extends from the blade. The blade has a plurality of through bores that are diamond-shaped and extend in a specific configuration forming a vacuum when the blade is swatted, thereby sucking in a fly. The plurality of through bores include one central through bore and four peripheral through bores. The four peripheral through bores, each of which is 1 cm high and ½ cm wide, are positioned substantially at corners of a rectangle. Two peripheral through bores are ½" from a forward edge of the blade, are 2¾" apart from each other, and are ⅝" from a pair of side edges of the blade, respectively. The other two peripheral through bores are 2½" back from the two peripheral through bores, are 2¾" apart from each other, and are ½" from the pair of side edges, respectively. The one central through bore is central to the four peripheral through bores, is 1½ cm high, and is 1 cm wide.

16 Claims, 1 Drawing Sheet

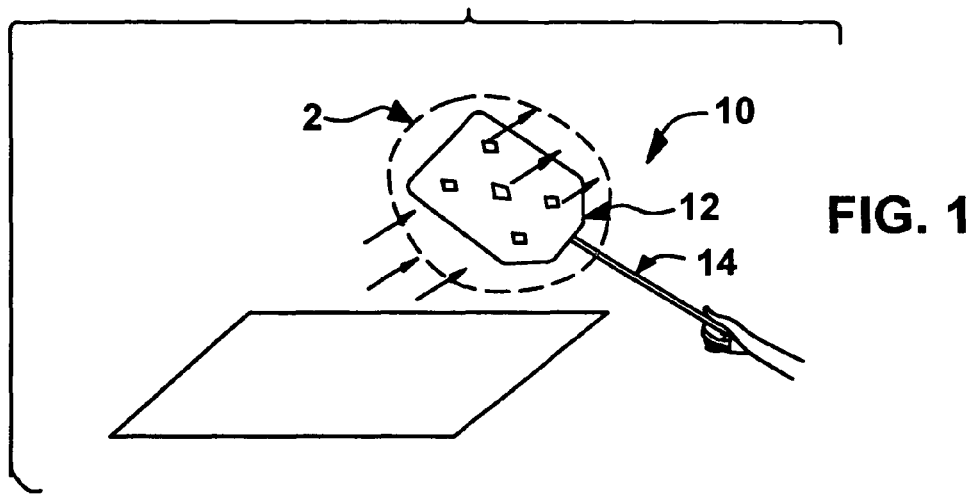
FIG. 1
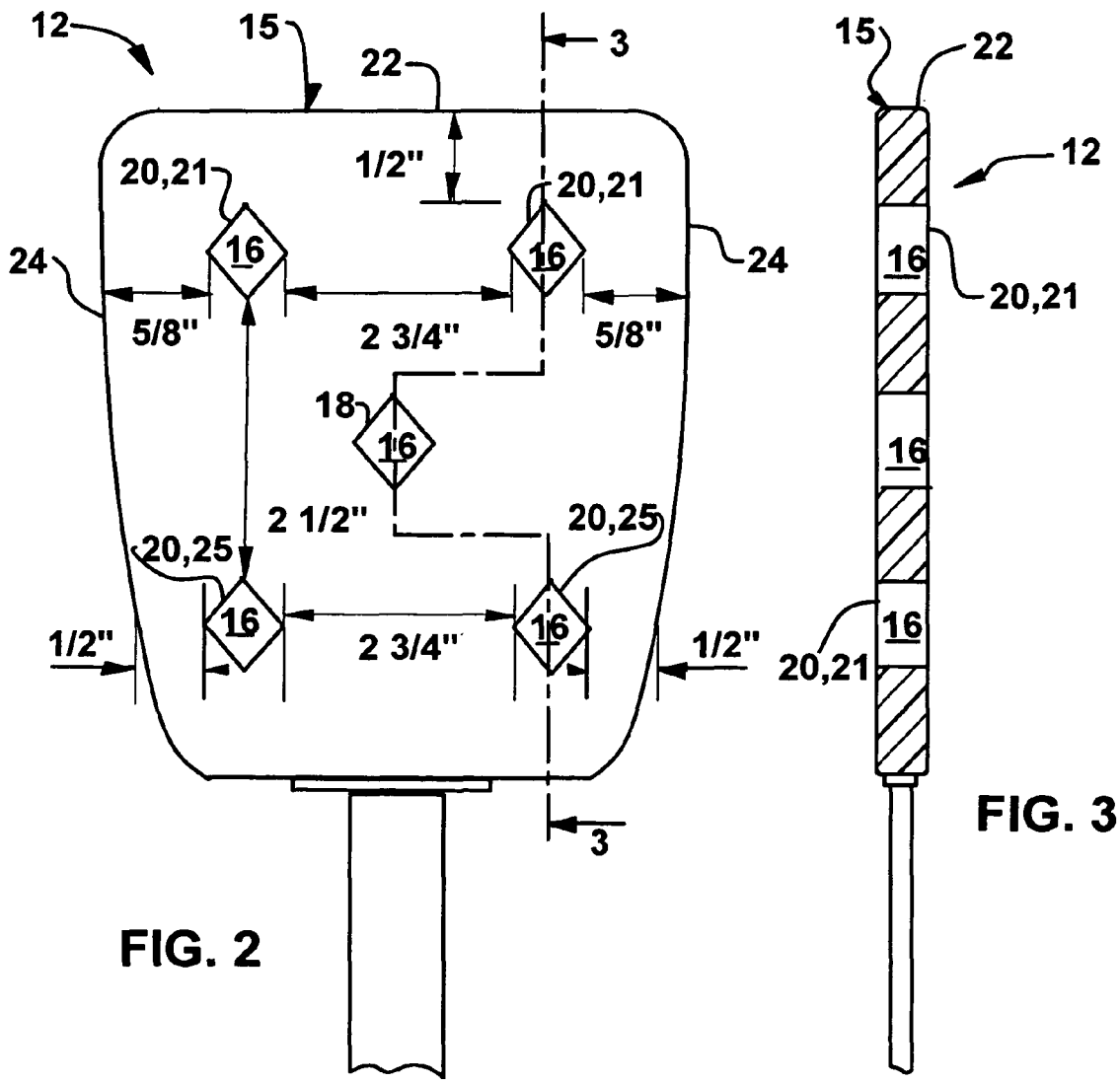
FIG. 2
FIG. 3

VACUUM-CREATING FLY SWATTER

BACKGROUND OF THE INVENTION

1. Field of the Invention

The present invention relates to a fly swatter, and more particularly, the present invention relates to a vacuum-creating fly swatter.

2. Description of the Prior Art

Numerous innovations for fly swatters have been provided in the prior art that will be described. Even though these innovations may be suitable for the specific individual purposes to which they address, however, they differ from the present invention.

A FIRST EXAMPLE, U.S. Pat. No. 1,860,939 issued on May 31, 1932 to Miller teaches a fly swatter including a head or flap made of rubber-like material in sheet form and provided throughout the main portion of its surface with slits defining secondary flaps within the contour of the head or flap permitting the escape of air therebetween. The secondary flaps have independent movement of their own in the swatting operation, as well as movement as a part of the head or flap.

A SECOND EXAMPLE, U.S. Pat. No. 2,736,129 issued on Feb. 28, 1956 to Roop teaches a fly swatter including a molded blade member of flexible material having an inner end formed centrally and longitudinally thereof with an integral sheathing defining an internal wedge-shaped and resiliently expansible socket opening substantially at the inner end of the blade member and having forwardly converging top and bottom walls and side walls uniting the top and bottom walls. A lug is formed on the bottom wall and projects into the socket adjacent to the open end thereof. An elongated handle member includes an integral molding formed at the forward end thereof with a longitudinally tapered, wedge-shaped tongue extension for close-fitting, frictional insertion into and in engagement with the internal wall surfaces of said socket. The tongue extension is of a size to resiliently expand the walls of the sheathing when inserted in the socket. A positioning stop flange is integrally formed with the handle member at the rear end of the extension for abutting engagement with the open end of the socket. The tongue extension is formed on one side thereof with a recess which, when the tongue extension is fully inserted into the socket with the flange of the handle member in engagement with the wall surfaces defining the open end of the socket, receives the lug to retain positively the blade and handle members in operatively united but detachable relationship. The tongue extension is formed on the side thereof opposite to that containing the lug-receiving recess, and slightly forward thereof, with a second recess to provide an air pocket. A portion of the lug-receiving recess is of different curvature than the curvature of the corresponding portion of the lug to provide a space between the lug and tongue. The space and the second recess facilitates separation of the handle member from the sheathing.

A THIRD EXAMPLE, U.S. Pat. No. 3,673,730 issued on Jul. 4, 1972 to Hegenberger teaches a fly swatter blade for killing insects without squashing them including a perforated sheet of relatively resilient plastic material to which is bonded relatively thick cushioning strips formed of soft sponge-like plastic material.

A FOURTH EXAMPLE, U.S. Pat. No. 3,984,937 issued on Oct. 12, 1976 to Hamilton teaches a flyswatter device including an elongated handle portion having a flat head portion at one end thereof. A layer of material is provided on at least one side of the head portion. The layer of material is capable of receiving and holding a static electrical charge sufficient to cause flies or the like to adhere thereto.

A FIFTH EXAMPLE, U.S. Pat. No. 4,653,222 issued on Mar. 31, 1987 to Viscosi teaches an insect swatter including a handle having an enlarged head portion with a raised lip around the perimeter of the head portion. A pair of pads of replaceable adhesive paper are each secured to both sides of the head portion to permit insects to adhere to the top sheets of the adhesive paper without the adhesive paper adhering to household surfaces and crushing the insects. A wall mounted poison holder is also provided to store the insect swatter when not in use.

A SIXTH EXAMPLE, U.S. Pat. No. 5,586,407 issued on Dec. 24, 1996 to Raymond teaches a swatter having a handle and a flat swatting blade that is fast with the handle. The blade is provided with openings which are uniformly distributed over the blade. Two sets of impaling projections are mounted on one of the major surfaces of the blade. The projections of the two sets are of different length and are uniformly distributed over the blade and among each other. Neighboring projections of each set are spaced from one another by distances that are so large that essentially no squashing of an insect would occur were the insect to be impaled by more than one projection of a set.

A SEVENTH EXAMPLE, U.S. Pat. No. DES. 415,814 issued on Oct. 26, 1999 to Re teaches the ornamental design for a fly swatter.

AN EIGHTH EXAMPLE, U.S. Pat. No. 6,055,767 issued on May 2, 2000 to Carter teaches a fly swatter for killing insects. The device includes an elongate handle member with a substantially planar swatting member extending from the proximal end of the handle member. The swatting member has opposite substantially planar first and second swatting surfaces. Provided on each swatting surface of the swatting member are a plurality of swatting sheets. The swatting sheets of each plurality of swatting sheets are adhesively coupled to the adjacent swatting sheets its respective plurality.

It is apparent that numerous innovations for fly swatters have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, it is an object of the present invention to provide a vacuum-creating fly swatter that avoids the disadvantages of the prior art.

Briefly stated, another object of the present invention is to provide a vacuum-creating fly swatter. A blade is flat and a handle is hand-held, slender, elongated, and extends from the blade. The blade has a plurality of through bores that are diamond-shaped and extend in a specific configuration forming a vacuum when the blade is swatted, thereby sucking in a fly. The plurality of through bores include one central through bore and four peripheral through bores. The four peripheral through bores, each of which is 1 cm high and ½ cm wide, are positioned substantially at corners of a rectangle. Two peripheral through bores are ½" from a forward edge of the blade, are 2¾" apart from each other, and are ⅝" from a pair of side edges of the blade, respectively. The other two peripheral through bores are 2½" back from the two peripheral through bores, are 2¾" apart from each other, and are ½" from the pair of side edges, respectively. The one central through bore is central to the four peripheral through bores, is 1½ cm high, and is 1 cm wide.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

FIG. 1 is a diagrammatic perspective view of the vacuum-creating fly swatter of the present invention in use;

FIG. 2 is an enlarged diagrammatic top plan view of the are generally enclosed by the dotted curve identified by ARROW 2 in FIG. 1 of the blade of the vacuum-creating fly swatter of the present invention; and FIG. 3 is a diagrammatic cross sectional view taken along LINE 3-3 in FIG. 2.

LIST OF REFERENCE NUMERALS UTILIZED IN THE DRAWING 10 vacuum-creating fly swatter of present invention
12 blade
14 handle
15 peripheral edge of blade 12
16 plurality of through bores extending through blade 12 in specific configuration and orientation that has empirically formed vacuum when blade 12 is swatted, thereby sucking fly thereto.
18 one central through bore of plurality of through bores 16 in blade 12
20 four peripheral through bores of plurality of through bores 16 in blade 12
21 two peripheral through bores of four peripheral through bores 20 of plurality of through bores 16 in blade 12
22 forward edge of peripheral edge 15 of blade 12
24 pair of side edges of peripheral edge 15 of blade 12
25 other two peripheral through bores 25 of four peripheral through bores 20 of plurality of through bores 16 in blade 12

DETAILED DESCRIPTION OF THE PREFERRED EMBODIMENT

Referring now to the figures, in which like numerals indicate like parts, and particularly to FIG. 1, which is a diagrammatic perspective view of the vacuum-creating fly swatter of the present invention in use, the vacuum-creating fly swatter of the present invention is shown generally at 10.

The vacuum-creating fly swatter 10 comprises a blade 12 and a handle 14. The blade 12 is flat. The handle 14 is slender, elongated, extends from the blade 12, and is for being hand-held.

The specific configuration of the blade 12 can best be seen in FIGS. 2 and 3, which are, respectively, an enlarged diagrammatic top plan view of the are generally enclosed by the dotted curve identified by ARROW 2 in FIG. 1 of the blade of the vacuum-creating fly swatter of the present invention, and, a diagrammatic cross sectional view taken along LINE 3-3 in FIG. 2, and as such, will be discussed with reference thereto.

The blade 12 has a peripheral edge 15 and a plurality of through bores 16 extending therethrough in a specific configuration and orientation forming a vacuum when the blade 12 is swatted, thereby sucking the fly thereto. Applicant is not aware of the exact mechanism causing this effect, however, applicant must disclose only the structure for the invention, he need not disclose or even understand the theory explaining how the invention achieves its aim.[1]

[1] In re Bowden and Iddings, 86 USPQ 419, 423 (CCPA 1950) ("Under the law a patent will be issued to an inventor although he may not understand the principle upon which his invention works. In re Parlanti et al., 34 C.C.P.A. (Patents) 803, 158 F.2d 1018, 72 USPQ 275."); Diamond Rubber Co. v. Consolidated Rubber Tire Co., 220 U.S. 428, 55 L.Ed. 527, 31 S.Ct. 444 (1911); Cf. DeForest Radio co. v. General Elec. Co., 283 U.S. 664, 668, 75 L.Ed. 1339, 51 S.Ct. 563, 7 USPQ 67 (1931).

Each through bore 16 in the blade 12 is diamond-shaped. The plurality of through bores 16 in the blade 12 are five in number and include one central through bore 18 and four peripheral through bores 20.

The peripheral edge 15 of the blade 12 has a forward edge 22 and a pair of side edges 24.

The four peripheral through bores 20 in the blade 12 are positioned substantially at corners of a rectangle.

Two peripheral through bores 21 in the blade 12 are a ½" from the forward edge 22 of the peripheral edge 15 of the blade 12, are 2¾" apart from each other, and are ⅝" from the pair of side edges 24 of the peripheral edge 15 of the blade 12, respectively.

The other two peripheral through bores 25 in the blade 12 are positioned 2½" back from the two peripheral through bores 21 in the blade 12, are 2¾" apart from each other, and are ½" from the pair of side edges 24 of the peripheral edge 15 of the blade 12, respectively.

Each peripheral through bore 20 in the blade 12 is 1 cm high and ½ cm wide.

The one central through bore 18 in the blade 12 is positioned centrally to the four peripheral through bores 20 in the blade 12, and is 1½ cm high and 1 cm wide.

It will be understood that each of the elements described above, or two or more together, may also find a useful application in other types of constructions differing from the types described above.

While the invention has been illustrated and described as embodied in a vacuum-creating fly swatter, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A vacuum-creating fly swatter, comprising:
   a) a blade; and
   b) a handle;
   wherein said blade is flat;
   wherein said handle is slender;
   wherein said handle is elongated;
   wherein said handle extends from said blade;
   wherein said handle is for being hand-held;
   wherein said blade has a plurality of through bores extending therethrough in a specific configuration and orientation forming a vacuum when said blade is swatted, thereby sucking a fly thereto;
   wherein each through bore in said blade is diamond-shaped in planar view; and wherein said plurality of through bores in said blade are five in number.

2. The swatter of claim 1, wherein said plurality of through bores in said blade include one central through bore.

3. The swatter of claim 2, wherein said plurality of through bore in said blade include four peripheral through bores.

4. The swatter of claim 3, wherein said blade has a peripheral edge;
wherein said peripheral edge of said blade has a forward edge; and
wherein said peripheral edge of said blade has a pair of side edges.

5. The swatter of claim 4, wherein said four peripheral through bores in said blade are positioned substantially at corners of a rectangle.

6. The swatter of claim 5, wherein two peripheral through bores in said blade are a ½" from said forward edge of said peripheral edge of said blade.

7. The swatter of claim 6, wherein said two peripheral through bores in said blade are 2¾" apart from each other.

8. The swatter of claim 7, wherein said two peripheral through bores in said blade are ⅝" from said pair of side edges of said peripheral edge of said blade, respectively.

9. The swatter of claim 8, wherein the other two peripheral through bores in said blade are positioned 2½" back from said two peripheral through bores in said blade.

10. The swatter of claim 9, wherein said other two peripheral through bores in said blade are 2¾" apart from each other.

11. The swatter of claim 10, wherein said other two peripheral through bores in said blade are ½" from said pair of side edges of said peripheral edge of said blade, respectively.

12. The swatter of claim 11, wherein each peripheral through bore in said blade is 1 cm high.

13. The swatter of claim 12, wherein each peripheral through bore in said blade is ½ cm wide.

14. The swatter of claim 13, wherein said one central through bore in said blade is positioned centrally to said four peripheral through bores in said blade.

15. The swatter of claim 14, wherein said one central through bore in said blade is 1½ cm high.

16. The swatter of claim 15, wherein said one central through bore in said blade is 1 cm wide.

* * * * *